May 23, 1950        H. D. COOK        2,508,493
AUTOMATIC TRAILER BRAKING SYSTEM
Filed July 31, 1946
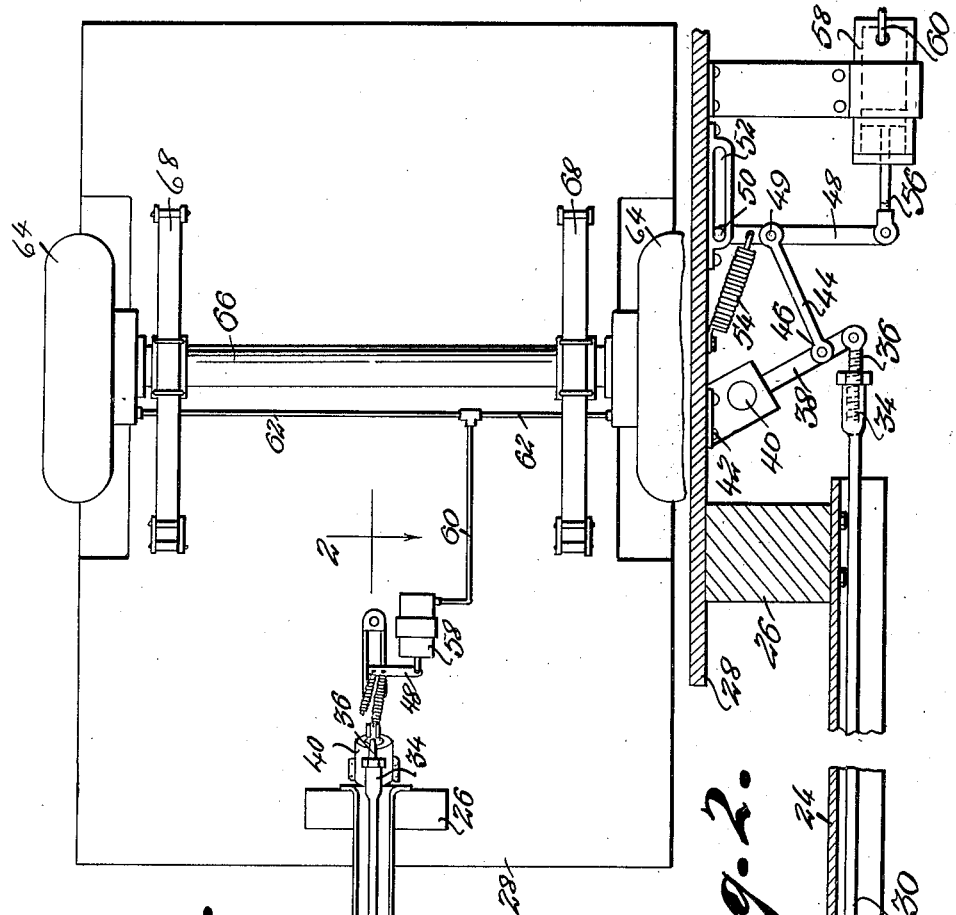
INVENTOR.
*Herbert D. Cook*
BY *Victor J. Evans & Co.*
ATTORNEYS Patented May 23, 1950

2,508,493

UNITED STATES PATENT OFFICE 2,508,493

AUTOMATIC TRAILER BRAKING SYSTEM

Herbert D. Cook, Worthington, Ind.

Application July 31, 1946, Serial No. 687,279

1 Claim. (Cl. 188—112)

My present invention relates to an improved automatic trailer braking system and more particularly to the automatic means for applying the trailer brakes as the towing vehicle slows down, and further to the means incorporated in the embodiment of my invention whereby the trailer is permitted to be backed even though the brake applying means is in operation.

In the accompanying drawings I have illustrated one complete example of the physical embodiment of my invention according to the best mode I have thus far devised but it will be understood that various alterations and changes may be made in the exemplified structure within the scope of the appended claim.

In the drawings—

Figure 1 is a bottom plan view of the brake mechanism of my invention as applied to a trailer.

Figure 2 is a transverse vertical sectional view taken at line 2—2 of Figure 1.

Referring now to the drawings, I have illustrated a draw bar 2 attached to the towing vehicle not shown. A plate 4 is bolted to the draw bar and this plate is fashioned with side flanges 6 and a tongue portion 8 and an opening therethrough as 10.

A slide member 12 is positioned to reciprocate on the plate in confinement between the flanges and this slide is formed with a ball 14 for coaction with the link 16 having a curved end 18 and an adjustment section 20 with screw 22 for securing the link to the ball. The connecting link 24 is attached to the frame 26 of the trailer 28. Thus as the trailer is pulled the link and slide member will assume a rearward position on the plate whereas when the towing vehicle slows, the slide will move forward.

The brake rod 30 is formed with a hooked end 32 engaging the hole 10 in the plate 8, and the rear end of the rod is enlarged and internally threaded as at 34 to receive the bolt 36. This bolt is pivotally attached to the lever 38 which is journaled in the fluid shock absorber of conventional design as 40, mounted as at 42 on the trailer 28. An actuator 44 is pivoted at 46 to the lever 38 and is connected to the floating lever 48 at the pivot 49. This floating lever is fashioned with a pin 50 engaging the guide frame 52 and the spring 54 releasably retains the pin in the position shown in Figure 2 subject to movement therein upon the application of excess pressure of an amount more than sufficient to operate the brakes.

The piston rod 56 is attached to the lower end of the lever 48 and operates within the cylinder 58 to apply the fluid therein through the pressure line 60 and the branches 62 to the wheels 64 mounted on axle 66 and springs 68 to apply the brakes.

From the above description of the construction and operation, it will be apparent that the device of my invention will effect the automatic application of the brakes of the trailer wheels almost instantaneously with the application of the brakes of the towing vehicle. The longitudinal movement of the slide 12 does not exceed one to one and one-half inches and the intermediate shock absorbed in the mechanical linkage will prevent the application of the trailer brakes which might otherwise result from jolts or jars, or uneven roadways. A definite movement of the trailer toward the towing vehicle is required to actuate the brake mechanism.

Having thus fully described my invention, what I claim as new and desire to secure by Letters Patent is:

A brake applying mechanism for a towing vehicle and a towed vehicle comprising a draw bar, adapted to be connected to a towing vehicle, a plate secured to said draw bar, side flanges on said plate and an apertured tongue portion on said plate extending outwardly of said draw bar at the rear end thereof, a slide member mounted on said plate between said flanges, a ball connection on said slide member centrally thereof, a connecting link secured to the frame of the towed vehicle, a connecting member having a curved forward end adapted to coact with said ball connection, a coupling means mounted for adjustment on said connecting member and coacting with said ball to secure the connecting member to said ball, a brake rod positioned in parallel relation to said connecting link and having a hooked front end adapted to coact with said apertured tongue portion, and said rod is provided with an enlarged internally threaded rear end, a bolt threadably mounted in said enlarged end, a shock absorber mounted on the towed vehicle, a lever for said shock absorber and the bolt carried by the rod is pivotally connected to said lever, an actuator pivoted to said lever above the pivoted connection to said bolt, a floating lever mounted on the towed vehicle and said actuator is adapted to be pivotally connected to said lever adjacent the upper end thereof, a guide frame on the towed vehicle, a pin in the upper end of the floating lever slidably mounted in said guide frame, a spring connected to said floating lever between the end carrying the pin and the connection of the actuator thereto to retain said pin in the forward end of the guide frame, a piston rod connected to the lower end of the actuator and said piston is mounted within a fluid cylinder connected to the brakes on the towed vehicle, whereby when the towing vehicle is in motion the brakes will be free but upon deceleration of said towing vehicle said slide member will be caused to slide to move said rod to apply the brakes of the towed vehicle.

HERBERT D. COOK.

REFERENCES CITED

The following references are of record in the file of this patent:

UNITED STATES PATENTS

| Number | Name | Date |
|---|---|---|
| 1,652,254 | Schlagenhauf | Dec. 13, 1927 |
| 1,966,670 | Klammer | July 17, 1934 |
| 2,051,522 | Graham | Aug. 18, 1936 |
| 2,116,052 | Turpin | May 3, 1938 |
| 2,156,590 | Humber | May 2, 1939 |
| 2,189,335 | Ace et al. | Feb. 6, 1940 |
| 2,215,586 | Hunter | Sept. 24, 1940 |
| 2,354,268 | McNamara | July 25, 1944 |